US012806780B2

(12) United States Patent
Graule et al.

(10) Patent No.: US 12,806,780 B2
(45) Date of Patent: Nov. 24, 2026

(54) SYSTEM AND METHOD FOR GRASP SYNTHESIS OF NON-OCCLUDED AND OCCLUDED OBJECTS WITH A CAMERA-EQUIPPED ROBOT MANIPULATOR

(71) Applicant: Ghost Robotics Corporation, Philadelphia, PA (US)

(72) Inventors: Moritz Graule, Philadelphia, PA (US); Avik De, Philadelphia, PA (US)

(73) Assignee: Ghost Robotics Corporation, Philadelphia, PA (US)

(*) Notice: Subject to any disclaimer, the term of this patent is extended or adjusted under 35 U.S.C. 154(b) by 0 days.

(21) Appl. No.: 18/808,001

(22) Filed: Aug. 18, 2024

(65) Prior Publication Data

US 2025/0121502 A1 Apr. 17, 2025

Related U.S. Application Data

(60) Provisional application No. 63/533,378, filed on Aug. 18, 2023.

(51) Int. Cl.

| | |
|---|---|
| ***B25J 9/00*** | (2006.01) |
| ***B25J 9/16*** | (2006.01) |
| ***B25J 19/02*** | (2006.01) |

(52) U.S. Cl.

CPC ............ *B25J 9/1669* (2013.01); *B25J 9/161* (2013.01); *B25J 9/163* (2013.01); *B25J 9/1653* (2013.01); *B25J 19/023* (2013.01)

(58) Field of Classification Search

CPC . B25J 9/1669; B25J 9/161; B25J 9/163; B25J 9/1653; B25J 19/023; B25J 13/065; B25J 15/08; B25J 9/1612; B25J 9/1697; G05B 2219/39536; G05B 2219/40564; G05B 2219/40613

See application file for complete search history.

(56) References Cited

U.S. PATENT DOCUMENTS

| | | | | |
|---|---|---|---|---|
| 2017/0217021 | A1* | 8/2017 | Hoffman | B25J 13/025 |
| 2017/0326728 | A1* | 11/2017 | Prats | H04N 13/204 |
| 2017/0348854 | A1* | 12/2017 | Oleynik | A47J 47/02 |
| 2020/0193606 | A1* | 6/2020 | Douillard | G01S 17/931 |
| 2020/0316782 | A1* | 10/2020 | Chavez | B25J 9/1697 |
| 2022/0016767 | A1* | 1/2022 | Ku | B25J 9/1697 |
| 2022/0152819 | A1 | 5/2022 | Ku et al. | |
| 2022/0193894 | A1* | 6/2022 | Barry | B25J 13/006 |
| 2022/0288783 | A1* | 9/2022 | Sundermeyer | G06T 7/55 |
| 2023/0182293 | A1 | 6/2023 | Shaw et al. | |

* cited by examiner

*Primary Examiner* — Khoi H Tran
*Assistant Examiner* — Tien Minh Le
(74) *Attorney, Agent, or Firm* — White and Williams LLP

(57) ABSTRACT

The present invention is directed to a system and method for grasp synthesis of non-occluded and occluded objects by a robot manipulator with grippe. A robot manipulator with gripper and gripper camera is in communication with a user interaction device. The user interaction device presents visual and audio feedback to the user and accepts user input and feedback for human-in-the-loop grasp synthesis and execution. The robot manipulator comprises an arm first link, an arm second link connected to the arm first link via an elbow joint, wrist actuators, at least one gripper, gripper jaws, a gripper camera, and arm base actuators.

19 Claims, 9 Drawing Sheets

Gripper (red/blue) and grasp box (green) sketches for various gripper designs and gripper configurations. Grasp box can be of arbitrary size and shape.

SYSTEM AND METHOD FOR GRASP SYNTHESIS OF NON-OCCLUDED AND OCCLUDED OBJECTS WITH A CAMERA-EQUIPPED ROBOT MANIPULATOR

CROSS REFERENCE TO RELATED APPLICATIONS

This application claims the benefit of earlier filed U.S. Patent Application Ser. No. 63/533,378, filed Aug. 18, 2023, the entire contents of which are hereby incorporated by reference.

BACKGROUND OF THE INVENTION

The present invention is directed to a system and method for grasp synthesis of non-occluded and occluded objects. Grasp synthesis refers to the process of determining the optimal way for a robotic manipulator to grasp an object. This involves calculating the appropriate contact points, grip force, gripper configurations, and gripper position and orientation with respect to the object needed to securely hold or manipulate the object. Effective grasp synthesis must take into account various factors such as the object's shape, size, weight, texture, and the surrounding environment.

Fully autonomous grasp synthesis still faces challenges in terms of adaptability and reliability, especially in dynamic and unstructured environments. This is where semi-automated approaches can offer significant advantages, combining the precision of automated systems with the intuition and problem-solving capabilities of human operators. In such systems, the cognitive load to the user and time required for execution is minimized through partial automation, while the user is presented with visualizations and the option to guide or intervene throughout the process.

SUMMARY OF THE INVENTION

The present invention pertains to a system and method for the development of grasp synthesis and grasp execution with a camera-equipped robot manipulator. The camera can contain grayscale, color, and/or color and depth modules and may include an inertial measurement unit ("IMU").

In addition to the camera-equipped robot manipulator, the system may contain a device (or devices) to relay information to a human operator throughout the grasp synthesis and execution process. This device is used to present the user with information about the state of the system, object information, and synthesized grasp candidates. The system may further contain a device (or devices) to gather input from the human operator, which allows the operator to assist or intervene in the process of grasp synthesis and execution or take over control of the system entirely if required.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The various embodiments are illustrated by way of example, and not by way of limitation, in the figures of the accompanying drawings. Having thus described the invention in general terms, reference will now be made to the accompanying drawings, which are not necessarily drawn to scale, and wherein.

DETAILED DESCRIPTION OF THE PREFERRED EMBODIMENT

Figure 1:
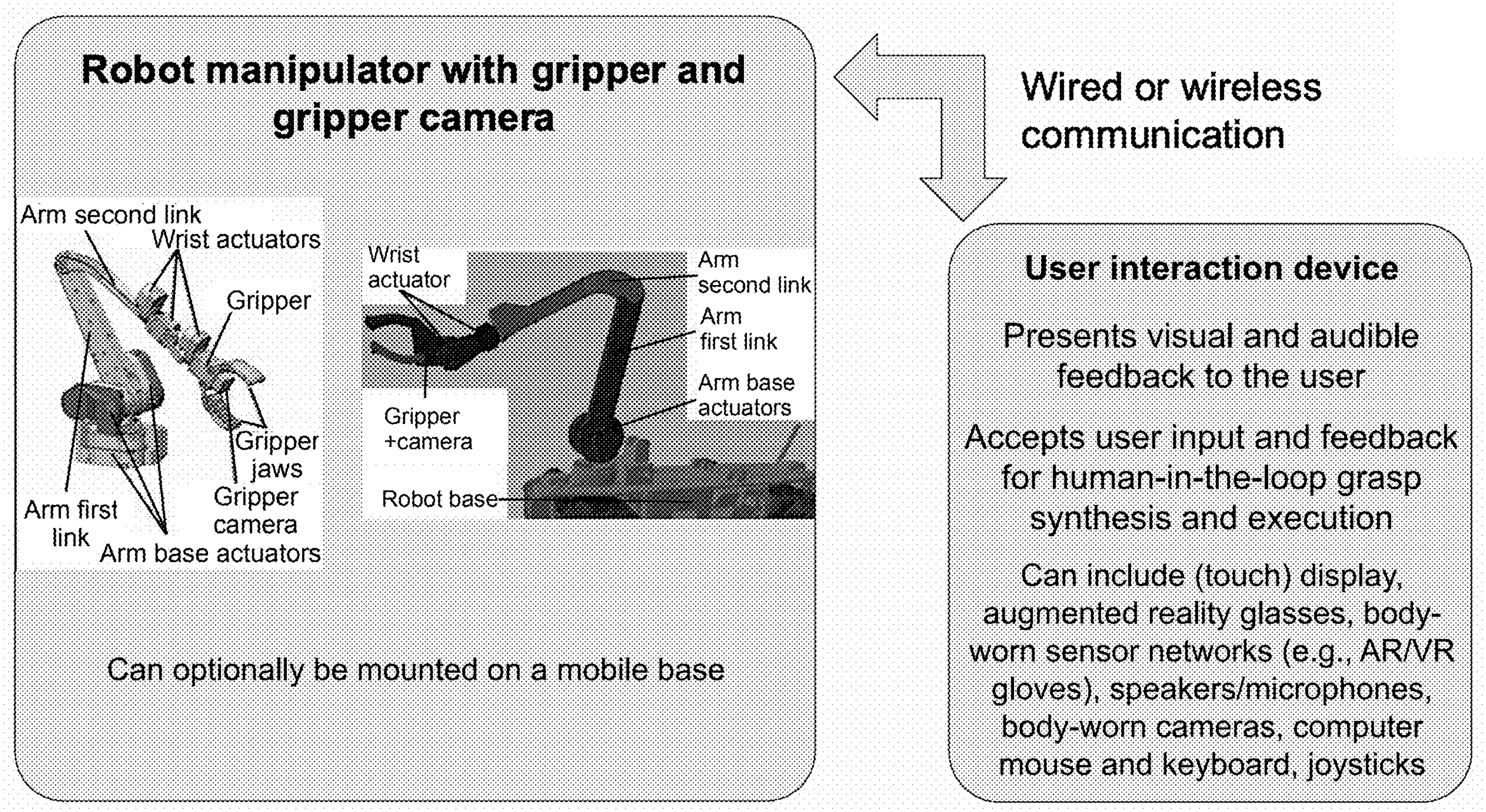
FIG. 1 is a system overview.

FIG. 1 is a system overview. In accordance with the preferred embodiment of the present invention, a robot manipulator with gripper and gripper camera is in communication with a user interaction device. The user interaction device presents visual and audio feedback to the user and accepts user input and feedback for human-in-the-loop grasp synthesis and execution. User input may include input from a touch display, augmented reality glasses, body-worn sensor networks (for example, and not by way of limitation, augmented reality or virtual reality gloves), speakers/microphones, body-worn cameras, computer mouse and keyboard, joysticks, etc. The robot manipulator with gripper and gripper camera can optionally be mounted on a mobile base, for example and not by way of limitation, the robot manipulator may be mounted on a legged robot. The robot manipulator comprises an arm first link, an arm second link connected to the arm first link via an elbow joint, wrist actuators, at least one gripper, gripper jaws, a gripper camera, and arm base actuators. The wrist and arm base actuators provide the manipulator with several degrees of freedom ("DoF").

Figure 2:
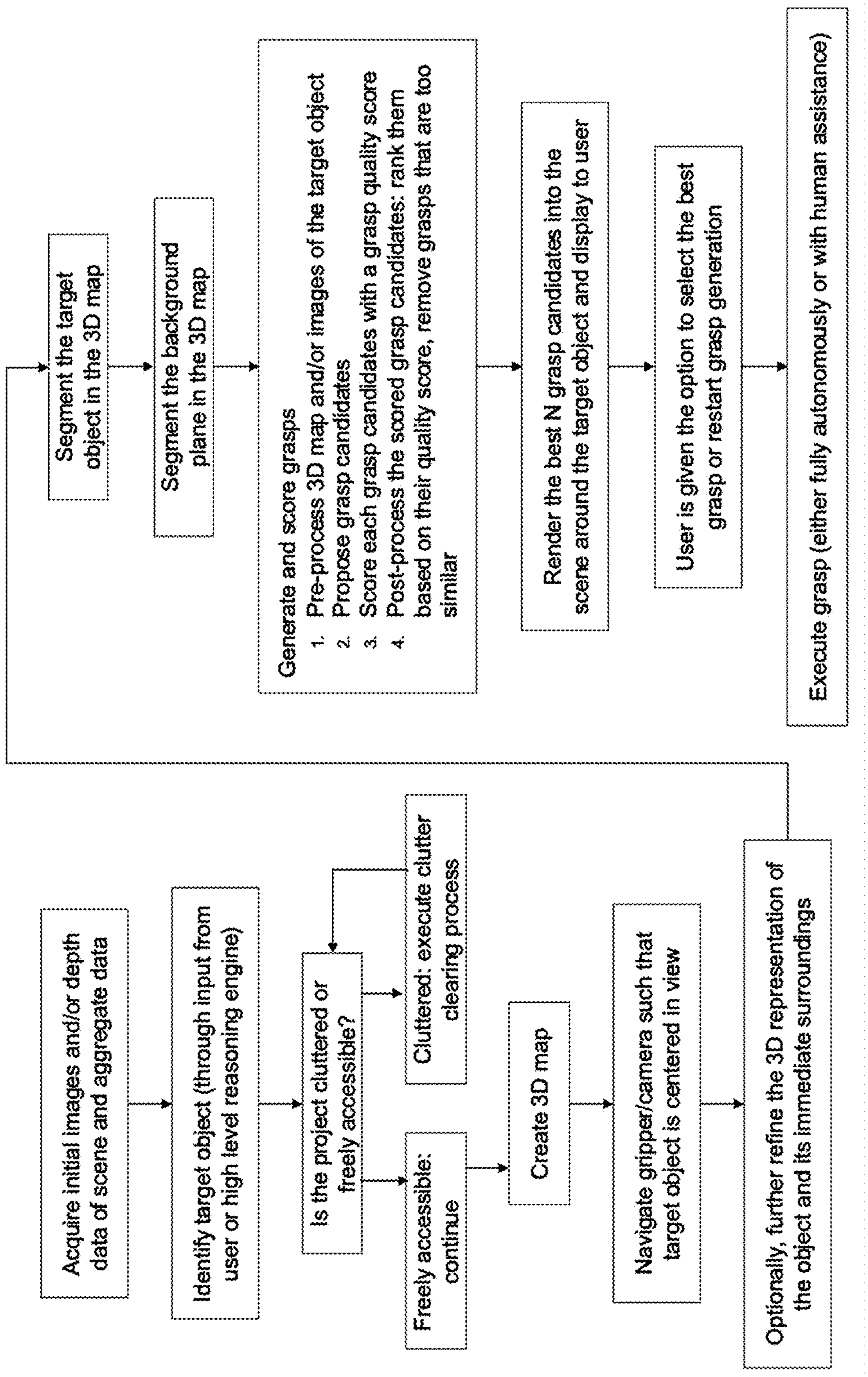
FIG. 2 is a process flowchart.

FIG. 2 is a process flowchart. In accordance with the preferred embodiment of the present invention, the system's grasp synthesis and execution are initialized as follows: a user or higher-level behavioral logic module specifies the target object, which is assumed to be present on a surface. This target object can be an object on the ground or a raised platform such as a table, a doorknob attached to a door, or a valve mounted on a wall.

Figure 3:
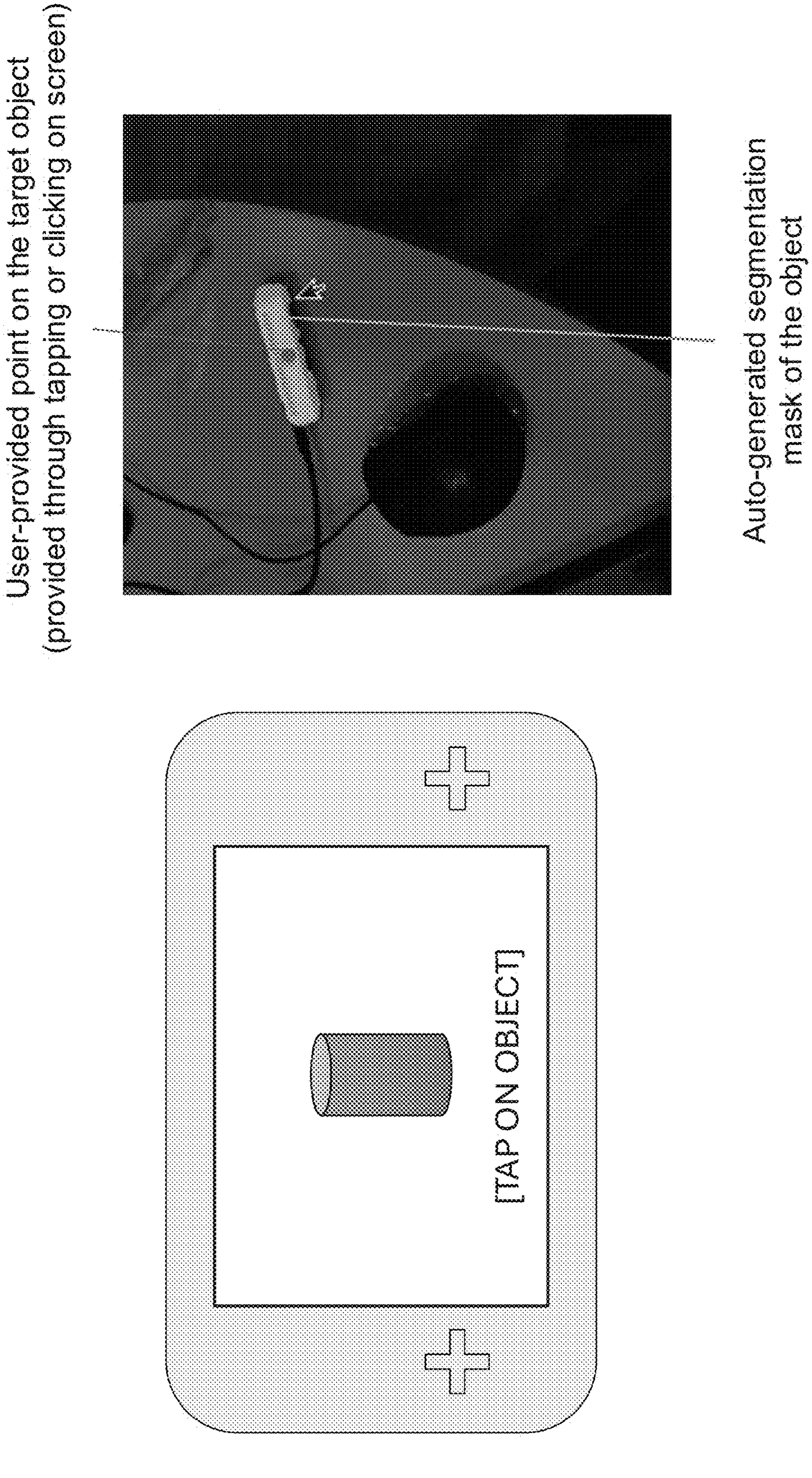
FIG. 3 is an example UI for target object selection through tapping on the screen.
Figure 4:
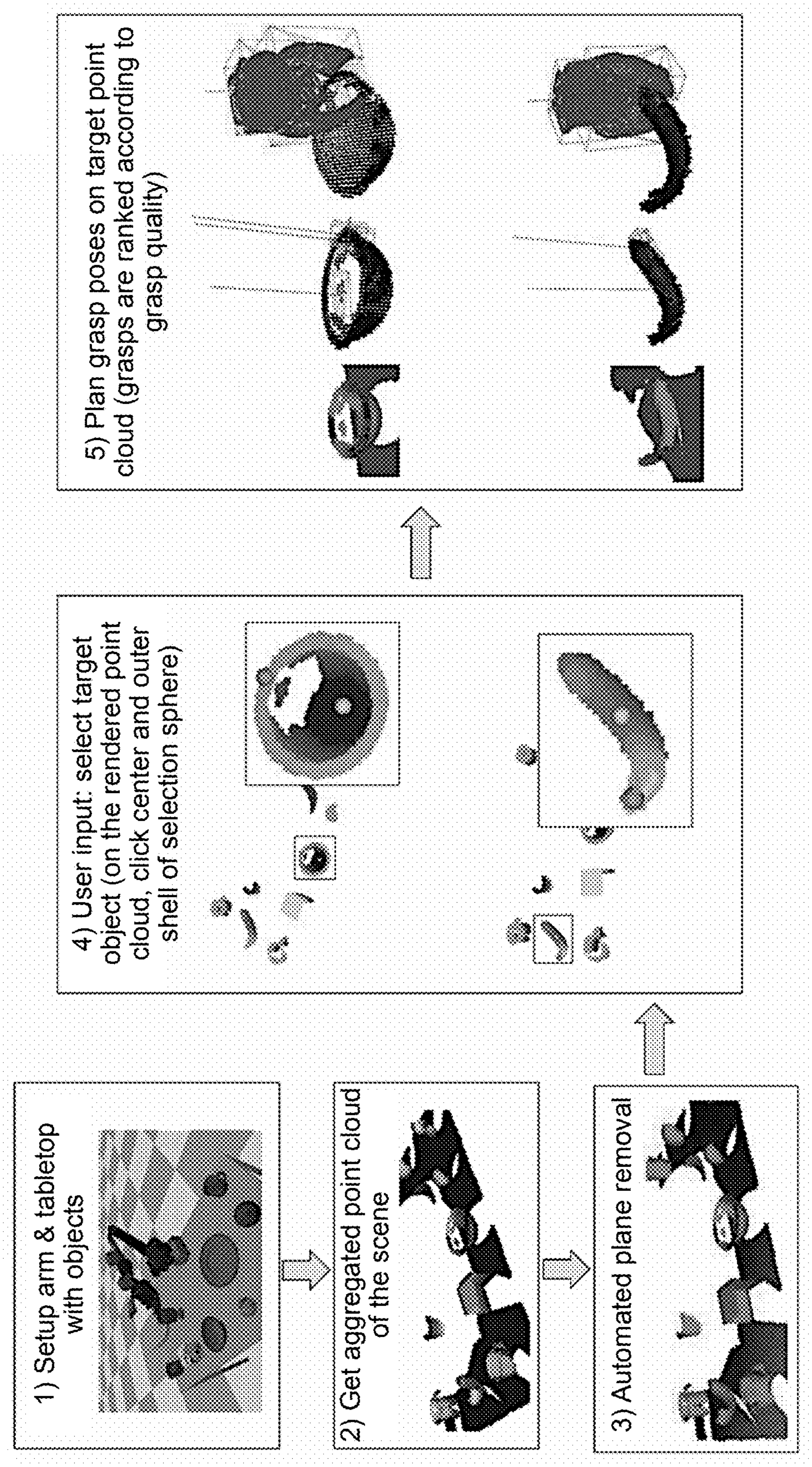
FIG. 4 is an example UI for target object selection through tapping on a rendered 3-dimensional ("3D") representation of the scene.

For example, and not by way of limitation, one of the following methods may be used to specify the target object: through a single click on a display showing the image taken by the gripper camera—a segmentation mask of the object is then generated using either a deep learning segmentation model or a traditional segmentation method (as shown in FIG. 3); through two clicks, selecting the center of the object and a point on the outer shell of a sphere; through encircling the target object on a screen; through describing the object in writing (for example, writing "the red cup")—an open-vocabulary or closed-vocabulary object detector (for example, a vision transformer) and/or object segmentation model is then used to identify the object's location in the camera image; through verbally describing the object in speech, which is translated into text using a speech-to-text model—an open-vocabulary or closed-vocabulary object detector (for example a vision transformer) and/or object segmentation model is then used to identify the object's location in the camera image; through one or more clicks on a rendered 3D representation of the scene (as shown in FIG. 4); through marking an area of interest in a virtual reality system; and through pointing at an object in the environment, where the system uses cameras or order sensors to detect and localize the operators hands, identify the operators pointing gesture and extrapolate where they are pointing in the scene.

Figure 5:
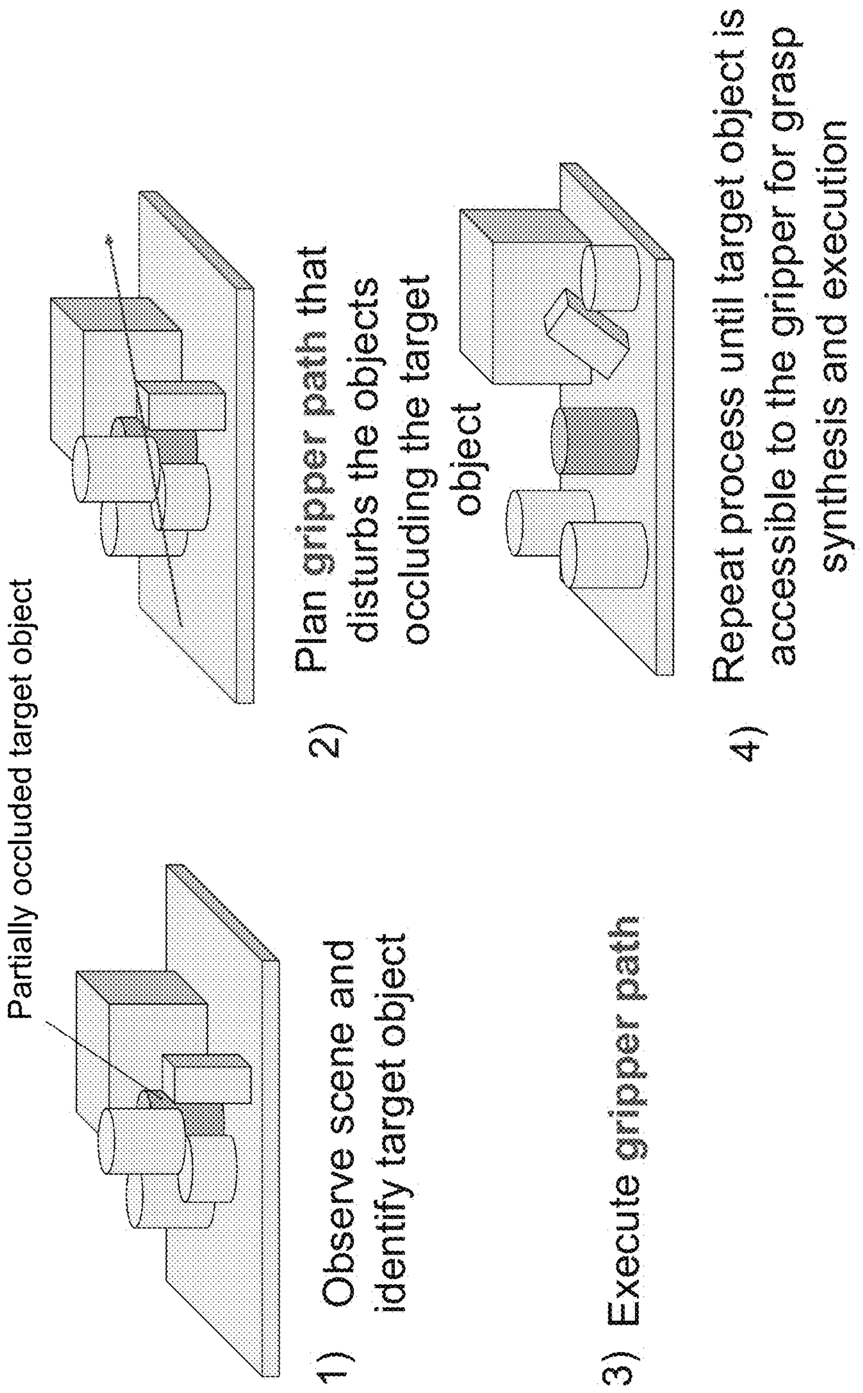
FIG. 5 depicts clutter clearing.
Figure 6:
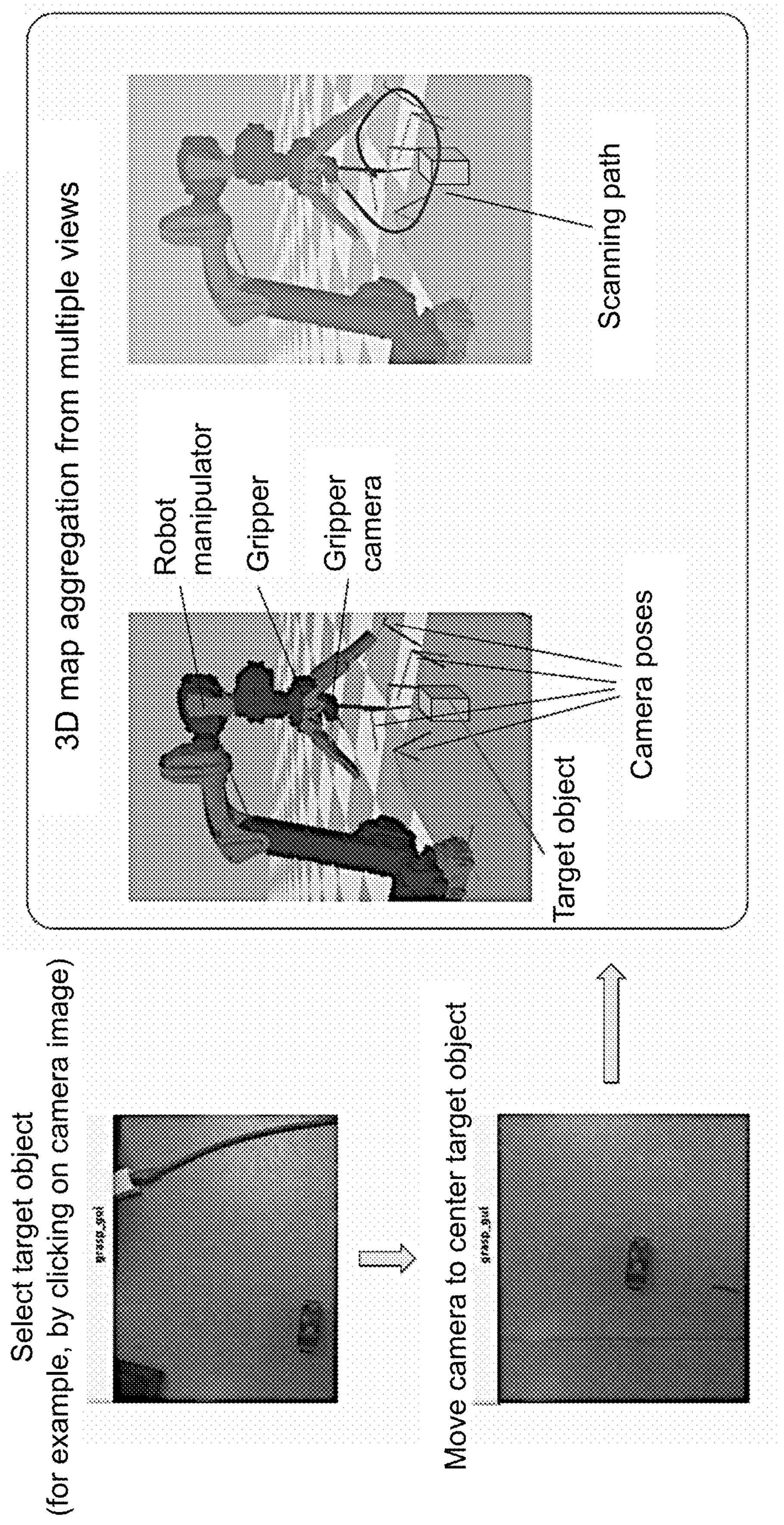
FIG. 6 depicts a 3D map aggregation centered around a target object.

If the target object is surrounded by clutter, the user can instruct the system to "clear clutter" before proceeding with grasp synthesis. If instructed to clear clutter, the system will compute and execute an end effector path that makes contact with the target object and multiple objects surrounding it, displacing the target object and other objects that may be obstructing it (as shown in FIG. 5). In the embodiment where the system consists of a legged robot base carrying a manipulator arm, the system may use its legs or other body parts to disturb the clutter. The user may also draw an end effector path onto a tablet screen to guide the clutter clearing path. In the following step, the camera can be used to create a 3D representation (the "3D map") of the area around the target object (for example, a point cloud or an occupancy grid). This step can leverage a single camera/gripper pose, or combine data acquired from multiple camera positions (as shown in FIG. 6).

The robot navigates the gripper camera such that the object is centered in the camera image in an autonomous manner. This can be done using 3D features from the depth camera or based purely on the feedback extracted from a gripper-mounted vision sensor.

Figure 9:
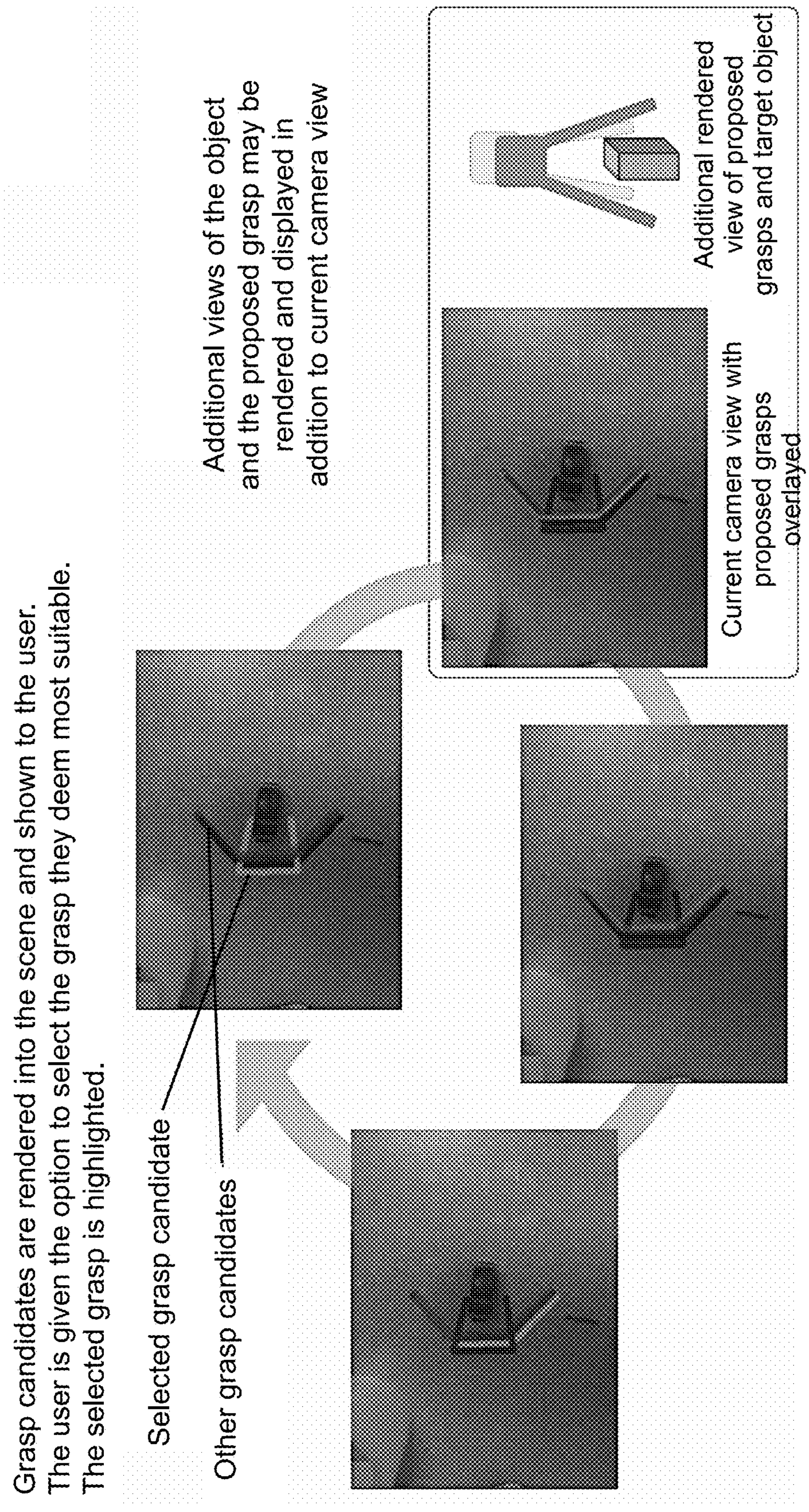
FIG. 9 depicts visualization and selection of grasp candidates.

For the best N2 grasps according to the quality metric, a sketched representation of each grasp is rendered onto the gripper camera image (for example, and not by way of limitation, with an opacity less than 100%) and displayed to the user (as shown in FIG. 9). Optionally, the user may select the grasp they consider the most promising.

If no promising grasps are identified by the system of the user, the system May autonomously restart the grasp synthesis process (including the generation of the 3D map) or change the position of the manipulator base in an automated or user-controlled fashion. If one or more promising grasps were identified, the system executes the selected grasp: the gripper is moved to the pre-grasp pose, and the gripper opening is set according to the planned grasp. The gripper is then moved from the pre-grasp pose to the grasp pose along the prescribed grasp approach axis according to one of the methods described herein.

Throughout the grasp approach and execution, the user is presented with a live camera field, updated renderings that explain how the selected grasp will interact with the target object, as well as a measure of applied gripping torque through a visualization and/or audible signal and can intervene in the grasp execution as they deem appropriate. The user can be informed if a grasp failure is detected—either through a visual or audible signal.

FIG. 3 is an example UI for target object selection through tapping on the screen. In accordance with the preferred embodiment of the present invention, a target object may be specified through a single click on a display showing the image taken by the gripper camera. A segmentation mask of the object may then be generated using either a deep learning segmentation model or a traditional segmentation method. In this embodiment, a user has access to a device or devices with at least one screen. In some embodiments, the screen may be interacted with via touch, at least one button, at least one joystick, at least one mouse, or some combination thereof. The screen of the device may display the image received from the gripper camera, which may be angled to show a target object. The user may interact with the screen via selecting the target object as shown in the screen, indicating to the manipulator to initiate a grasp of the target object.

FIG. 4 is an example UI for target object selection through tapping on a rendered 3D representation of the scene. In accordance with the preferred embodiment of the present invention, a target object may be specified via one or more clicks on a rendered 3D representation of the scene. This method for specifying a target object begins with the setup of the 3D representation of the scene, followed by the aggregation of the point cloud of the scene and automated plane removal. User input is then used to select the target object on the rendered point cloud via clicking the center and outer shell of a selection sphere. A plurality of grasp poses is then planned on the target point cloud. Grasp poses are ranked according to the grasp quality, and the highest ranked grasp pose is executed.

FIG. 5 depicts clutter clearing. In accordance with the preferred embodiment of the present invention, a partially occluded target object may be specified wherein surrounding clutter must be cleared in order to execute a grasp of the target object. Clutter clearing begins by observing a scene and identifying the target object. A gripper path is planed that disturbs the objects occluding the target object in order to grasp the target object. This gripper path is then executed and the process of planning and executing a plurality of gripper paths is repeated until the target object is accessible to the gripper for grasp synthesis and execution.

FIG. 6 depicts a 3D map aggregation. In accordance with the preferred embodiment of the present invention, the robot may optionally refine the 3D map by navigating the gripper camera around the target area in an automated fashion, aiming the camera at the target object and aggregating the collected data into a high-resolution 3D map. As part of this process, the system maintains a list of previously visited camera/gripper poses, such that it can be computed which areas of the scene were occluded by obstacles or the target object. The system can then move the gripper environment in an automated fashion. Alternatively, the camera is moved to a predetermined set of poses around the object. The 3D map may now be optimized to reduce its size while retaining the geometric features most relevant to grasp synthesis. Next, the previous user input (including the generated RGB segmentation mask, if available) is used to segment the target object in the 3D map. Then, an algorithm is used to determine the "background" component of the 3D map (the ground or table, the door, or the wall in the examples discussed above). This algorithm can be RANSAC, a machine learning segmentation algorithm, etc. An additional algorithm is used to estimate in which plane the background components of the 3D map lie, yielding an estimate of the plane's surface normal.

Figure 7:
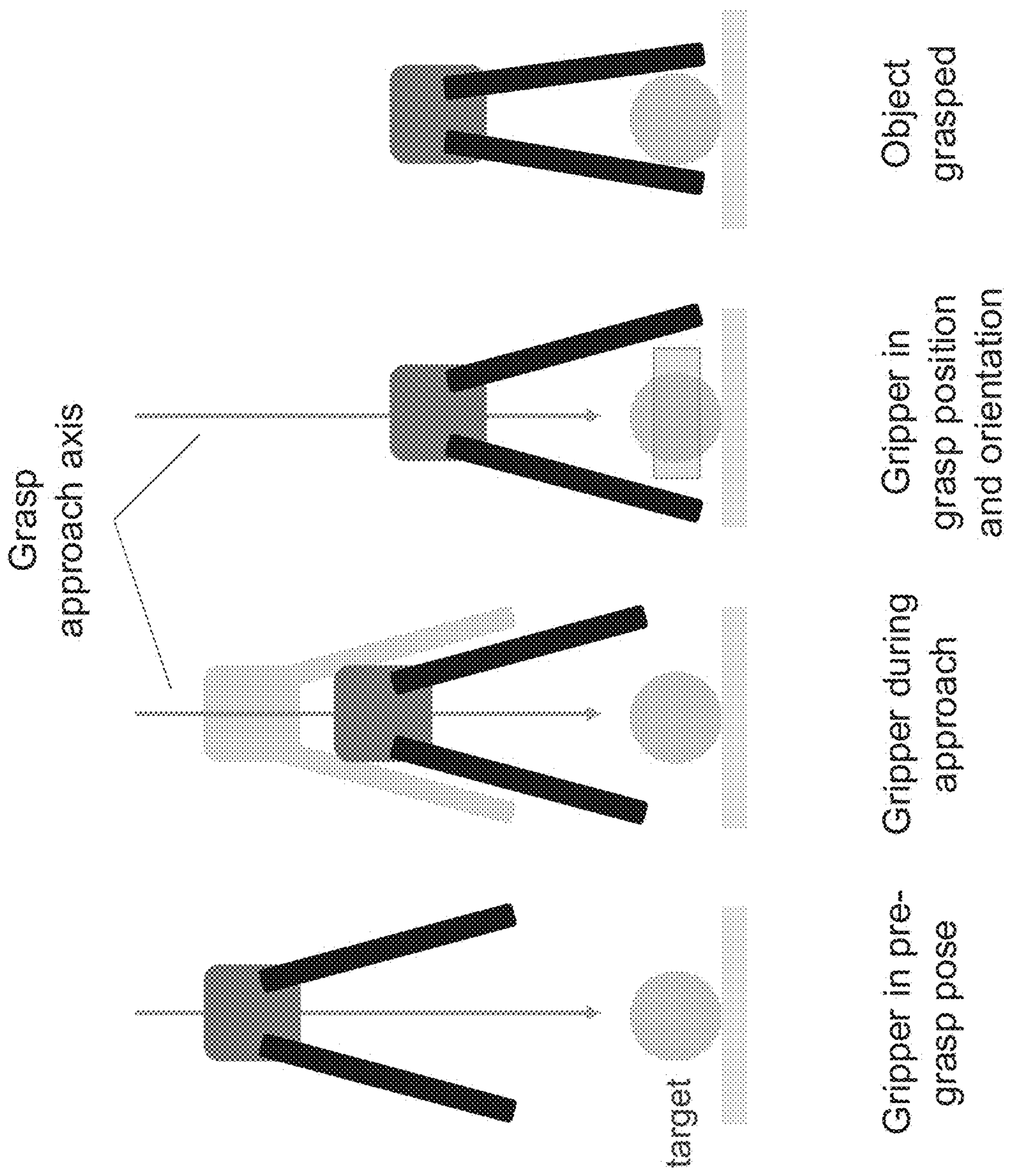
FIG. 7 depicts grasp candidates from pre-grasp to grasp execution.

FIG. 7 depicts grasp candidates from pre-grasp to grasp execution. In accordance with the preferred embodiment of the present invention, grasp candidates are synthesized using the image of the object and the segmented 3D map of the target object. Each proposed grasp candidate consists of a pre-grasp pose, a grasp pose, a pre-grasp gripper opening setpoint, an approach axis, and—optionally—a set of force thresholds. The grasp pose is the pose in which the gripper must be before the fingers are being closed. The approach axis is the axis along which the gripper should be moved to get to the final grasp pose. The pre-grasp pose is a pose that is offset from the final grasp pose along the approach axis.

The pre-grasp pose is far enough away from the object to ensure that no collision between gripper and target object occurs no matter the gripper opening angle. At the pre-grasp pose, the gripper opening is set to the pre-grasp gripper opening setpoint.

Figure 8:
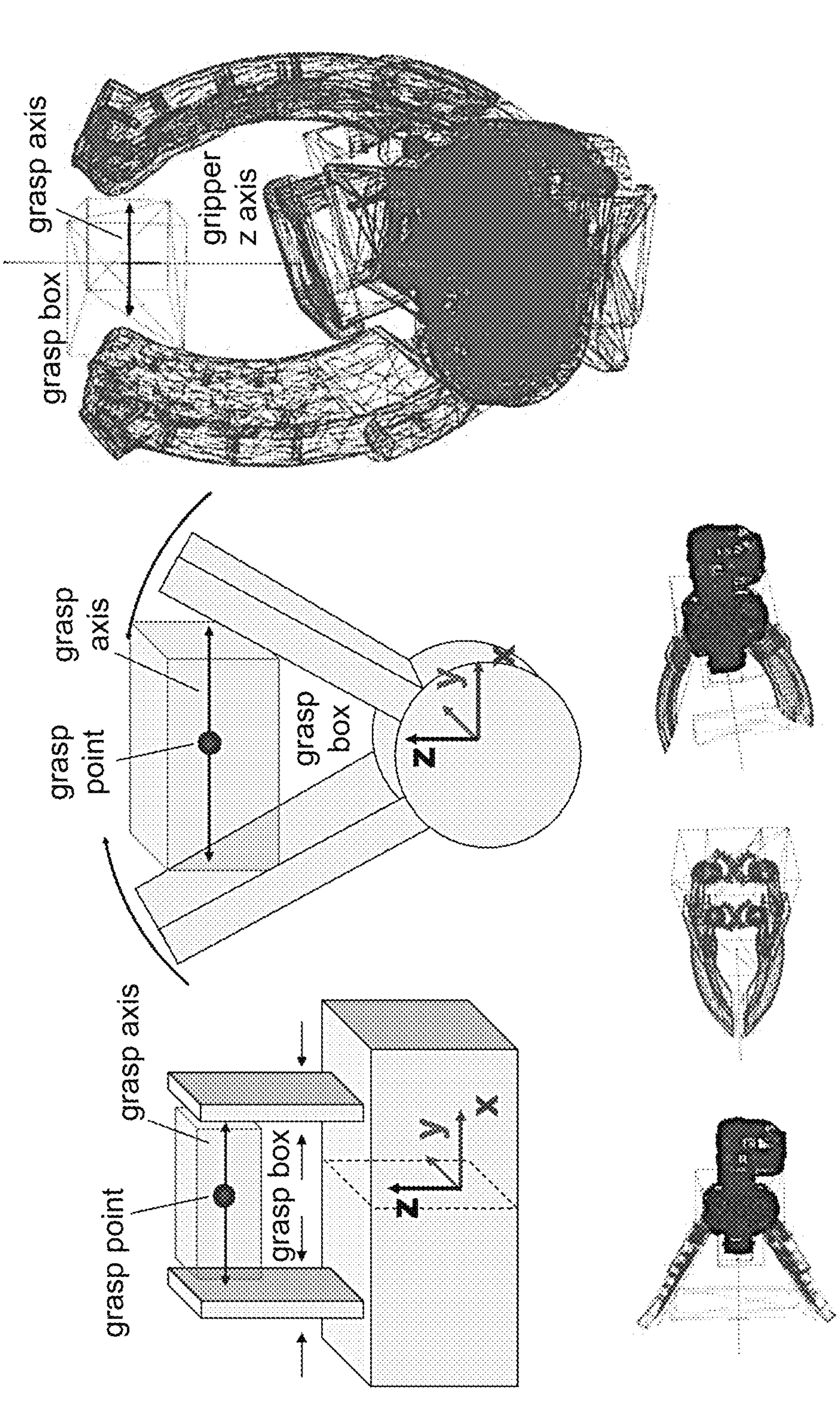
FIG. 8 depicts the gripper representation.

FIG. 8 depicts the gripper representation. In accordance with the preferred embodiment of the present invention, the grasp synthesis uses a gripper representation that contains the following information as shown: the "grasp point" (a function of gripper opening angle)—a point within the gripper, on the center axis between the two fingers; the "grasp box"—a box around the part of the gripper from which the system aims to grasp (this can either cover the full fingers or just part of it); the "grasp axis"—the axis along with the fingers close in on the target object; and the "gripper z-axis". Elements of the gripper representation is a function of gripper design and operating conditions.

FIG. 9 depicts visualization and selection of grasp candidates. In accordance with the preferred embodiment of the present invention, the generation of these grasp candidates relies on a gripper representation. It includes the following steps: pre-processing (for example, computation or estimation of surface normals of the target object); identification of which grasp proposal methods and grasp scoring methods are most appropriate (for example, assessment of 3D map quality and whether the grasp synthesis should rely solely on the camera image, solely on the 3D map, or on a combination of the two); proposing a series of grasp candidates according to one of the methods described herein; assign a quality score to each grasp candidate, which represents a grasp quality metric; applying post-processing and filtering to the grasp candidates comprising: using a high-level path planner to ensure that the path along the approach axis from pre-grasp to grasp is collision-free and kinematically possible given the robot geometry and joint limits, remove similar grasps (i.e., if several grasps vary in position and orientation by less than pre-specified thresholds, only the grasp candidate with the highest quality score is selected, only maintain the N1 grasps with the highest quality score. Optionally, the user can inspect visualizations provided by the pre-processing, grasp proposer, and quality scoring methods.

The grasp proposal methods available in the system include synthesis based on the target object's point clouds as well as methods that rely solely on input from the gripper camera's vision sensor, which may be grayscale or RGB. In one grasp proposal method that leverages a point cloud representation of the object, the system first computes the point cloud centroid. It then generates a gripper pose G that places the 'grasp point' at the point cloud centroid, then generates M1 poses {G_m1} by translating G in cartesian coordinates by a small distance (for example, and not by way of limitation, 0-1 cm), in random directions, then sample M2 gripper poses around each pose in {G_m1} by rotating the gripper in increments of 180 degrees/M2. This process is repeated M3 times, resulting in M1×M2×M3 poses for grasp candidates. This method is well-suited for thin-walled objects like mugs and open boxes, and thin objects like pens or cables, among other objects.

In another grasp proposal method that leverages point cloud representation of the object, the system fits a cuboid or cylinder to the point cloud of the target object, places the grasp point at the centroid of the cuboid or cylinder, orients the gripper such that the grasp axis aligns with the direction of the smallest dimension of the cuboid or cylinder, and sets the desired gripper opening angle to be the smallest object dimension+a small offset.

In another grasp proposal method that leverages a point cloud representation of the object, the system projects the 3D points of the target object onto the 'background plane' and then applies principal component analysis to the projected points to find the following two axes: the primary axis a1 explaining maximum variance, and the secondary axis a2 along with the residuals are minimized (where a1 and a2 lie within the background plane). The system then generates a grasp pose candidate for which the gripper's grasp axis aligns with a2.

In another grasp proposal method that leverages a point cloud representation of the object, a deep neural network is trained beforehand to map a point cloud to a set of 6DoF grasp poses. The neural network is used to infer suitable grasp candidates from the target object's point cloud.

In another grasp proposal method that leverages a point cloud representation of the object, an object recognition module (for example, a deep neural network or a point cloud-based object matching algorithm such as iterative closest point ("ICP")) is used to associate the target object with an object maintained in a library of known objects. In this library, each of the known objects is linked with a set of suitable grasp poses.

In one grasp proposal method that leverages the gripper image of the object as well as the user input indicating the object, the image segmentation mask of the target object is obtained (for example, from the input method, or with a neural network trained for segmentation). Then principal component analysis is run on the segmentation mask pixels (in image plane) to identify the axis a1 explaining maximum variance, and the axis a2 along which the residuals are minimalized. The grasp pose candidate is oriented such that the grasp axis aligns with axis a2. This method is particularly useful for scenarios where we can identify the orientation of the supporting plane (such as a floor, table, door, wall, etc.) but have a hard time obtaining a good 3D representation of the target object. Reasons why obtaining a good 3D representation may not be possible include: the object of interest is too thin or too small and its dimensions are within the resolution of the depth camera (for example, the object of interest is a key, a sheet of paper or other material, a coin, a cable, etc.); or the object of interest has surface properties that make it difficult to obtain a good depth image (for example, the object of interest has a reflective surface, a transparent surface, etc.).

In another grasp proposal method that leverages the gripper image of the object, a deep neural network is trained beforehand to predict grasp poses from grayscale or RGB images and used to predict suitable grasp candidates.

In another grasp proposal method, the system relies on a demonstration from the user how to grasp a previously unknown object. In this scenario, the target object is presented to the system beforehand in a separate 'teach step'. In this teaching step, the system then moves the gripper camera around the presented object to acquire a 3D representation of the object—this representation may include color information as well. The operator then demonstrates suitable grasp poses on the object. This information is then stored in memory, in a library of 'known objects'—together with a descriptor of the object. During regular operation (i.e., after the teaching step), when a target object is encountered with a descriptor that matches an object in the system's library, the previously demonstrated grasps are proposed (accounting for the target object's pose). In another grasp proposal method, some or all of the aforementioned methods are combined.

In one of the grasp quality metrics implemented in the system, the system rewards if the grasp axis is perpendicular to the surface of the target object: given the surface normal of the target object (which may be estimated in a general preprocessing stem, or ad-hoc), the quality score/metric is obtained as follows: average of the dot product between the grasp axis and all surface normal; average taken over the area inside the grasp box.

Another metric can be obtained by assigning higher score to grasps for which the object surface normals align with the gripper finger surface normals when in contact with the object (score based on a volume-averaged dot product between the object surface normal and finger surface normals; averaged over the grasp box).

Another metric can be obtained by assigning a higher score to grasps closer to the object centroid. Here, the score is proportional to the distance between the object point cloud's centroid and the grasp axis.

A similar metric can be obtained by first using a neural network to estimate the target object's centroid from grayscale, RGB, and/or point cloud, and then assigning a higher score to grasps closer to the estimated centroid. Here, the score is proportional to the distance between the estimated centroid and the grasp axis.

Another metric can be obtained by assigning higher scores to grasps for which a larger part of the grasp box overlaps with the target object's volume.

Another metric can be obtained by assigning scores to grasps proportional to the number of target object point cloud points within the grasp box for each grasp. Another metric can be obtained by estimating the object's surface properties (specifically, coefficient of friction) across various parts of the object (estimation input: point cloud and/or image data); and then sum the coefficient of friction over across the part of the object's surface that falls inside the grasp box of a given grasp. Another metric can be obtained by a weighted combination of all the metrics mentioned above.

In one automated grasp approach method, the gripper moves from pre-grasp to grasp pose until one of the following termination strategies is met: in force-based grasp approach termination, the gripper is moved towards the grasp target pose until the external force on the gripper along the grasp approach axis exceeds a predetermined threshold FT; in pose-based grasp approach termination, the gripper is moved towards the grasp pose until the error in position is smaller than a predetermined threshold PT and the error in orientation is smaller than a predetermined threshold OT. Once the termination criterion is met, the gripper closes. In one semi-automated grasp approach method, the operator commands the gripper pose to move along the approach axis (through either joystick inputs, or a slider on a screen, or buttons, etc.) and confirms with a button click when the gripper should begin closing. The system of the present invention may further comprise at least one processor in communication with the robot manipulator, the user interaction device, and other components associated with the system including but not limited to a computer and a memory.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. A system for grasp synthesis of non-occluded and occluded objects with a camera-equipped robot manipulator, said system comprising:

a robot manipulator with a gripper and gripper camera, wherein said robot manipulator is configured to execute a grasp of a target object;

a device that provides at least one user interaction channel configured to present visual and audio feedback to a user and accept user input and feedback;

at least one end effector in communication with said robot manipulator and said device, that provides at least one user interaction channel, configured to displace said target object, in response to identifying that said target object is occluded, such that said target object's state is transformed from occluded to non-occluded;

at least one processor in communication with said robot manipulator and said user device that provides at least one user interaction channel, wherein said processor calculates appropriate contact points, grip force, gripper configurations, and gripper position and orientation with respect to said target object to securely hold or manipulate said object;

at least one memory in communication with said at least one processor, configured to receive and store data from said robot manipulator and said user device that provides at least one user interaction channel.

2. The system of claim 1, wherein said robot manipulator is a robotic arm comprising a plurality of arm base actuators, an arm first link, an arm second link connected to said arm first link via an elbow joint, wrist actuators, and at least one gripper including gripper jaws, a gripper camera.

3. The system of claim 1, wherein said user device that provides at least one user interaction channel comprises a touch display.

4. The system of claim 1, wherein said user device that provides at least one user interaction channel comprises at least one joystick.

5. The system of claim 1, wherein said robot manipulator is further configured to clear a plurality of objects occluding said target object, upon at least one of user instructions or automation, wherein said robot manipulator executes an end effector path to displace said target object and other objects obstructing it.

6. The system of claim 1, wherein the robot manipulator is mounted on a mobile base.

7. The system of claim 6, wherein said mobile base is a legged robot.

8. A method for grasp synthesis of non-occluded and occluded objects with a camera-equipped robot manipulator, said method comprising:

estimating surface normals of a target object by a user interaction device to perform human-in-the-loop grasp synthesis;

identifying an appropriate grasp proposal method and grasp scoring method;

wherein said appropriate grasp proposal method and grasp scoring method comprise a feedback-controlled gripper path configured to disturb objects occluding said target object in order to grasp said target object, when said target object is occluded;

proposing a series of grasp candidates according to a selected grasp proposal method;

assigning a quality score to each of said grasp candidates proposed according to a selected grasp scoring method;

applying a post-processing and filtering method to said grasp candidates, said post-processing and filtering method comprising:

confirming, via a path planner, that a path along an approach axis from a pre-grasp position to a grasp position is collision-free and kinematically possible; and removing similar grasps with lower quality scores.

9. The method of claim 8, wherein said grasp proposal method comprises:

computing a point cloud centroid of said target object;

generating a gripper pose that places a grasp point at said point cloud centroid;

generating a plurality of primary poses via translating said gripper pose in cartesian coordinates in random directions;

sampling a plurality of secondary poses around each of said primary poses via rotating said gripper in increments; and repeating said sampling until a desired number of poses for grasp candidates is generated.

10. The method of claim 8, wherein said grasp proposal method comprises:

obtaining an image segmentation mask of said target object;

running a principal component analysis on a plurality of pixels of said segmentation mask;

identifying a primary axis explaining maximum variance and a secondary axis along which residuals are minimalized;

orienting a grasp pose candidate such that a grasp axis aligns with said secondary axis.

11. The method of claim 8, wherein said grasp proposal method comprises:

presenting a previously unknown object to said robot manipulator as a target object;

moving a gripper camera around said target object;

acquiring, via said gripper camera, a 3-Dimensional ("3D") representation of said target object;

demonstrating, via an operator, a suitable grasp pose on said target object; and storing said demonstration, along with a descriptor of said target object, in a memory library of known objects;

associating the target object with a second object within said library of known objects; and matching demonstrated grasps from said second object within said library of known objects to said target object.

12. The method of claim 8, wherein said method further comprises executing a proposed grasp of said target object with an optimal grasp score.

13. The method of claim 8, wherein robot manipulator is a robotic arm comprising a plurality of arm base actuators, an arm first link, an arm second link connected to said arm first link via an elbow joint, wrist actuators, and at least one gripper including gripper jaws, a gripper camera.

14. A system for grasp synthesis of non-occluded and occluded objects with a camera-equipped robot manipulator, said system comprising:

a robotic arm comprising a plurality of arm base actuators, an arm first link, an arm second link connected to said arm first link via an elbow joint, wrist actuators, and at least one gripper including gripper jaws, a gripper camera, wherein said robotic arm is configured to execute a grasp of a target object, and wherein said grasp of said target object is determined via a method for grasp synthesis, wherein said method comprises:

identifying an appropriate grasp proposal method and grasp scoring method;

wherein said appropriate grasp proposal method and grasp scoring method comprise a feedback-controlled gripper path configured to disturb objects occluding said target object in order to grasp said target object, when said target object is occluded;

calculating appropriate contact points, grip force, gripper configurations, and gripper position and orientation with respect to said target object;

proposing a series of grasp candidates according to a selected grasp proposal method;

assigning a quality score to each of said grasp candidates proposed according to a selected grasp scoring method;

wherein said grasp scoring method accounts for target object's shape, size, weight, texture, and surrounding environment; and applying a post-processing and filtering method to said grasp candidates;

a user device that provides at least one user interaction channel configured to present visual and audio feedback to a user and accept user input and feedback;

at least one processor in communication with said robot manipulator and said user device that provides at least one user interaction channel; and at least one memory in communication with said at least one processor, configured to receive and store data from said robot manipulator and said user device that provides at least one user interaction channel.

15. The system of claim 14, wherein said user device that provides at least one user interaction channel comprises a touch display.

16. The system of claim 14, wherein said user device that provides at least one user interaction channel comprises at least one joystick.

17. The system of claim 14, wherein said robot manipulator is further configured to clear a plurality of objects occluding said target object.

18. The system of claim 14, wherein the robot manipulator is mounted on a mobile base.

19. The system of claim 18, wherein said mobile base is a legged robot.

* * * * *